US007062861B2

(12) United States Patent
O'Mahony et al.

(10) Patent No.: US 7,062,861 B2
(45) Date of Patent: *Jun. 20, 2006

(54) SELF-CALIBRATING POSITION DETERMINATION SYSTEM AND USER INTERFACE

(75) Inventors: Patrick O'Mahony, San Jose, CA (US); Manjula Gururaj, Fremont, CA (US)

(73) Assignee: Snap-On Incorporated, Pleasant Prairie, WI (US)

( * ) Notice: Subject to any disclaimer, the term of this patent is extended or adjusted under 35 U.S.C. 154(b) by 13 days.

This patent is subject to a terminal disclaimer.

(21) Appl. No.: 10/813,430

(22) Filed: Mar. 31, 2004

(65) Prior Publication Data

US 2005/0005463 A1    Jan. 13, 2005

Related U.S. Application Data

(63) Continuation of application No. 10/183,460, filed on Jun. 28, 2002, now abandoned, and a continuation-in-part of application No. 10/170,401, filed on Jun. 14, 2002, now Pat. No. 6,839,972.

(60) Provisional application No. 60/301,954, filed on Jun. 28, 2001.

(51) Int. Cl.
*G01B 11/275* (2006.01)

(52) U.S. Cl. .................... 33/286; 33/288; 382/144

(58) Field of Classification Search ............. 33/286, 33/288, 203.18, 1 CC; 382/144, 154, 153
See application file for complete search history.

(56) References Cited

U.S. PATENT DOCUMENTS

| | | |
|---|---|---|
| 3,790,277 A | 2/1974 | Hogan |
| 4,396,945 A | 8/1983 | DiMatteo et al. |
| 4,519,705 A | 5/1985 | Morrow |
| 4,753,569 A | 6/1988 | Pryor |

(Continued)

FOREIGN PATENT DOCUMENTS

DE    29 48 573 A1    6/1981

(Continued)

OTHER PUBLICATIONS

Hunter Engineering Co. Product Literature "DSP400 Alignment Sensors", Form No. 4240T, Jan., 1999.

(Continued)

*Primary Examiner*—Diego Gutierrez
*Assistant Examiner*—Amy R. Cohen
(74) *Attorney, Agent, or Firm*—McDermott Will & Emery LLP

(57) ABSTRACT

A position determination system comprises a data processing system, a first measuring module, and a second measuring module. Both of the measuring modules are coupled to the data processing system. The first measuring module includes a first sensing device for obtaining positional data of a first testing target. A calibration sensing device is rigidly linked to the first sensing device. The positional relationship between the first sensing device and the calibration target is known. The system has a rotation mechanism for rotating the sensing device of the first sensing device. The second measuring module includes a second sensing device for obtaining positional data of a second testing target. A calibration target is rigidly linked to the second sensing device, and is used with the calibration sensing device to obtain a positional relationship between the calibration target and the calibration sensing device. The positional relationship between the second sensing device and the calibration target is known. A rotation mechanism is provided for rotating the second sensing device. The data processing system provides a user interface for indicating the positions of the first and second sensing devices.

18 Claims, 15 Drawing Sheets

U.S. PATENT DOCUMENTS

| | | | |
|---|---|---|---|
| 5,046,032 A | 9/1991 | Alusick et al. | |
| 5,274,433 A | 12/1993 | Madey et al. | |
| 5,531,030 A | 7/1996 | Dale, Jr. | |
| 5,535,522 A | 7/1996 | Jackson | |
| 5,675,515 A | 10/1997 | January | |
| 5,724,128 A | 3/1998 | January | |
| 5,724,129 A | 3/1998 | Matteucci | |
| 5,724,743 A | 3/1998 | Jackson | |
| 5,809,658 A | 9/1998 | Jackson et al. | |
| 5,870,315 A | 2/1999 | January | |
| 6,064,750 A | 5/2000 | January et al. | |
| 6,101,455 A | 8/2000 | Davis | |
| 6,151,787 A | 11/2000 | Wright et al. | |
| 6,298,284 B1 | 10/2001 | Burns, Jr. et al. | |
| 6,424,411 B1 | 7/2002 | Rapidel et al. | |
| 6,498,959 B1 | 12/2002 | January et al. | |
| 6,594,600 B1 | 7/2003 | Arnoul et al. | |
| 6,731,382 B1 * | 5/2004 | Jackson et al. | 356/139.09 |
| 6,842,238 B1 | 1/2005 | Corghi | |
| 2002/0080343 A1 | 6/2002 | Bux et al. | |
| 2002/0189115 A1 | 12/2002 | Jackson et al. | |

FOREIGN PATENT DOCUMENTS

| | | |
|---|---|---|
| EP | 0149690 | 7/1985 |
| EP | 1 003 011 A1 | 5/2000 |
| EP | 0948760 B1 | 7/2002 |
| FR | 2 764 992 | 12/1998 |
| JP | 200263477 | 9/2000 |
| WO | WO99/22281 | 5/1999 |
| WO | WO 0016121 | 3/2000 |
| WO | WO 01/71280 A2 | 9/2001 |
| WO | WO 01/71280 A3 | 9/2001 |
| WO | WO 02/103286 A1 | 12/2002 |

OTHER PUBLICATIONS

Select pages from Hunter Engineering Co. Product Literature "Installation Instructions—DSP400 Sensors", Form No. 4345T, Jun., 1999.

Hunter Engineering Co. Product Literature "DSP400 Sensors", Form No. 4356T, Apr. 2000—illustrating DSP400DT pedestal mounted cameras.

* cited by examiner

LSRS - Theta 45.7° Y2.8"

LSRM - Theta 41.6° Y3.0"

LSRL - Theta 38.3° Y3.2"

LMRS - Theta 42.4° Y-2.8"

LMRM - Theta 38.6° Y-2.6"

LMRL - Theta 34.9° Y-2.4"

LLRS - Theta 39.3° Y-8.0"

LLRM - Theta 35.5° Y-7.8"

LLRL - Theta 31.7° Y-7.6"

SELF-CALIBRATING POSITION DETERMINATION SYSTEM AND USER INTERFACE

RELATED APPLICATION

The present application is a continuation-in-part of U.S. patent application Ser. No. 10/170,401, filed Jun. 14, 2002, now U.S. Pat. No. 6,839,972 and entitled "SELF-CALIBRATING POSITION DETERMINATION SYSTEM;" and a continuation of U.S. patent application Ser. No. 10/183,460, filed Jun. 28, 2002, now abandoned and entitled "SELF-CALIBRATING POSITION DETERMINATION SYSTEM AND USER INTERFACE," which claims the benefit of priority from U.S. Provisional Patent Application Serial No. 60/301,954, entitled "SYSTEM, METHOD AND USER INTERFACE FOR ADJUSTING THE YAW OF A SELF-CALIBRATING THREE-DIMENSIONAL ALIGNER," filed Jun. 28, 2001.

FIELD OF THE DISCLOSURE

The disclosure generally relates to a position determination system and user interface, and more specifically, to a self-calibrating position determination system and user interface using an advanced algorithm to determine the positions of directional sensors used in the system.

BACKGROUND

Position determination systems use directional sensors, such as cameras or directional light sensors, to determine positional parameters of objects under test. Such position determination systems are widely used in numerous applications. For example, wheels of motor vehicles may be aligned by a position determination system using cameras to view a target affixed to the wheels. The target has target elements with known geometric characteristics and positional interrelationships. The camera captures images of the target elements and determines the geometric characteristics and positional interrelationships thereof. The system then relates the geometric characteristics and positional interrelationships to the known geometric characteristics and positional interrelationships to determine the angular orientation of the target. The system then determines the alignment status of the wheels based on the angular orientation of the target. Examples of the systems are described in U.S. Pat. No. 5,724,743, titled "Method and apparatus for determining the alignment of motor vehicle wheels," and U.S. Pat. No. 5,535,522, titled "Method and apparatus for determining the alignment of motor vehicle wheels," both of which are commonly assigned to the assignee of the present disclosure and incorporated herein by reference.

Position determination systems using directional sensors, such as cameras, require a calibration process to determine relative positions between the cameras. Methods for calibrating the cameras are disclosed in U.S. Pat. No. 5,809,658, entitled "Method and Apparatus for Calibrating Alignment Cameras Used in the Alignment of Motor Vehicle Wheels," which is commonly assigned to the assignee of the present application and incorporated herein by reference.

However, it has been noted that there is a need for an adjustable, self-calibrating position determination system that is adapted to different sizes of objects under test.

There is another need for a user interface to indicate the positions of sensing devices used in the position determination system.

There is still another need to monitor the orientations of the sensing devices during system adjustments.

There is also a need to show positions or orientations of the sensing devices in real time.

Still one other need exists to provide a user interface to assist an operator during operation of the position determination system.

SUMMARY

The disclosure describes a self-calibrating position determination system and user interface that addresses the foregoing needs as well as other needs. The position determination system includes a data processing system, and a first and second measurement module for obtaining target images. Both of the measurement modules are coupled to the data processing system and are used for generating positional data of the object under test. The data processing system provides a user interface for indicating the current positions of the modules or the sensing devices included in the modules.

The first measurement module includes a first sensing device, a calibration sensing device, and a rotation mechanism. The first sensing device may be a camera or light sensor or the like for use with a testing target affixed to the object under test to generate positional data of the testing target relative to the measuring device. The calibration sensing device may be a camera or light sensor or the like, and is rigidly linked to the first sensing device. The positional relationship between the calibration sensing device and the first sensing device is known. The first sensing device can be rotated by the rotation mechanism to reposition or reorient the sensing field of the first sensing device such that the system can accommodate different sizes of objects under test.

The second measurement module has a structure similar to that of the first measuring module, except that the second measurement module has a calibration target in place of the calibration sensing device. The second measurement module includes a second sensing device, a calibration target and a rotation mechanism. The second sensing device is configured for use with a testing target device affixed to the object under test to generate positional data of the testing target device relative to the second sensing device. The calibration target is for use with the calibration sensing device in the first measurement module to generate positional data of the calibration target relative to the calibration sensing device. The calibration target is rigidly linked to the second sensing device and has a known positional relationship therebetween. The rotation mechanism is configured to rotate the second sensing device to reposition or reorient the sensing field of the second sensing device.

The data processing system is coupled to both of the measurement modules and is configured to process the positional data generated by the measurement modules to determine positional relationships between the sensing devices and targets. In one aspect, the data processing system is configured to receive signals related to: (1) a positional relationship of the first testing target relative to the first sensing device, (2) a positional relationship of the second testing target relative to the second sensing device; and (3) a positional relationship of the calibration target relative to the calibration sensing device. The data processing system calculates the respective positional relationships based on the signals. The data processing system then determines positional parameters for the first and second testing targets based on the calculated positional relationships.

In another aspect, the data processing system is configured to monitor the rotation of the sensing devices included in the modules, and to indicate the current positions of the sensing devices by using the user interface.

As described earlier, the sensing devices and the targets are used to generate positional data relating to the relative position between the sensing devices and the targets. In one aspect, the sensing devices may be any directional sensors that can sense signals from the testing targets, such as machine vision devices for sensing the images of the testing targets, or light sensors with directional sensing fields for sensing lights from a specific direction. Examples of machine vision devices are cameras or video cameras or the like. The testing/calibration targets may be specific patterns of images to be captured by machine vision devices. Optionally, the testing/calibration targets may be active light sources, such as LEDs.

In another aspect, the position determination system determines the current position of the sensing devices by comparing the current positional relationship between the calibration target and sensing device with those of a plurality of discrete reference positions. The reference positions are certain discrete reference points to which the alignment sensing devices can be positioned. Based on the comparison, the system can determine the current position of the sensing devises using the reference position that is the closest to the current position. For example, the system may use the reference position as the current positions of the sensing devices. Optionally, interpolation may be used to obtain a more precise indication of the positions.

An advanced algorithm may be used to obtain positional relationships between the calibration target and sensing device for each of the plurality of reference positions. By using the algorithm, the system can obtain all the positional relationships for each of the reference positions by measuring less than all positional relationships for the reference positions. In one aspect, if the first and second sensing device each has three reference positions, only five measurements need to be taken in order to obtain all the positional relationships for the nine possible combinations of the reference positions.

Still other advantages of the system and interface will become readily apparent from the following detailed description, simply by way of illustration and not limitation. As will be realized, the system and interface is capable of other and different embodiments, and its several details are capable of modifications in various obvious respects, all without departing from the disclosure. Accordingly, the drawing and description are to be regarded as illustrative in nature, and not as restrictive.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION OF ILLUSTRATIVE EMBODIMENTS

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

System Overview

Figure 1A:
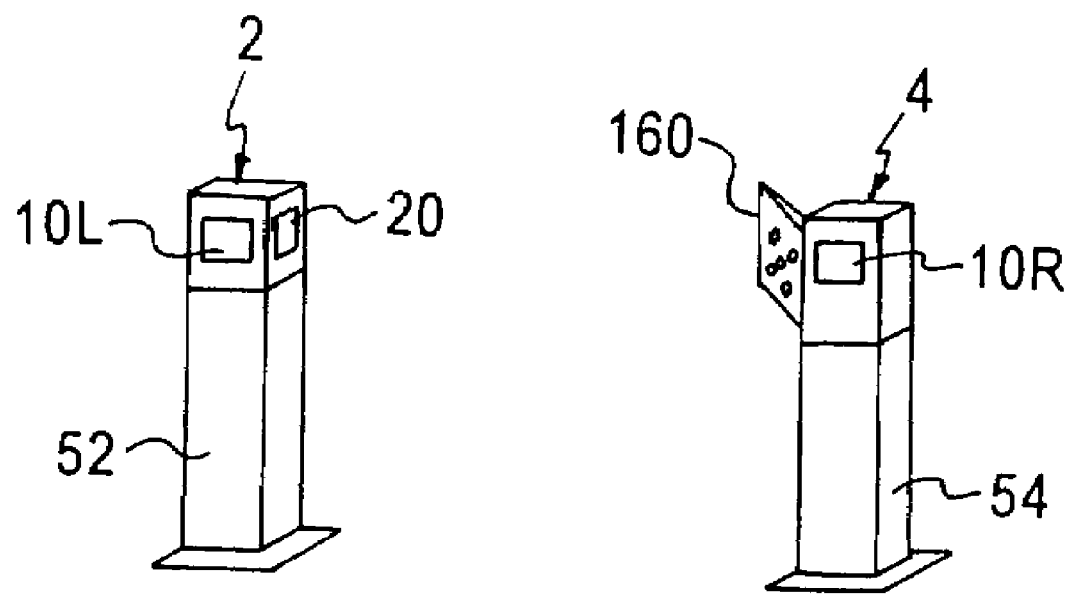
FIG. 1A is shows an exemplary position determination system.

FIG. 1A shows an adjustable, self-calibrating wheel alignment system ("aligner") upon which an exemplary position determination system and user interface may be implemented is described. The aligner has a left measurement module 2 and a right measurement module 4. The measurement modules include alignment cameras 10L, 10R for capturing images and generating positional data of alignment targets affixed to a vehicle under test. The alignment cameras, 10L, 10R are supported by a left upright 52 and a right upright 54 respectively. A data processing system (not shown) is coupled to the alignment cameras 10L, 10R for processing the positional data and determining the positions of the alignment targets. The aligner has a rotation mechanism configured to rotate the alignment cameras 10L, 10R. Depending on the size of vehicles under alignment process, the rotation mechanism rotates the cameras such that the viewing fields of the alignment cameras 10L, 10R are repositioned to see the alignment targets properly. The data processing system provides a user interface to communicate with a user operating the system.

Figure 1B:
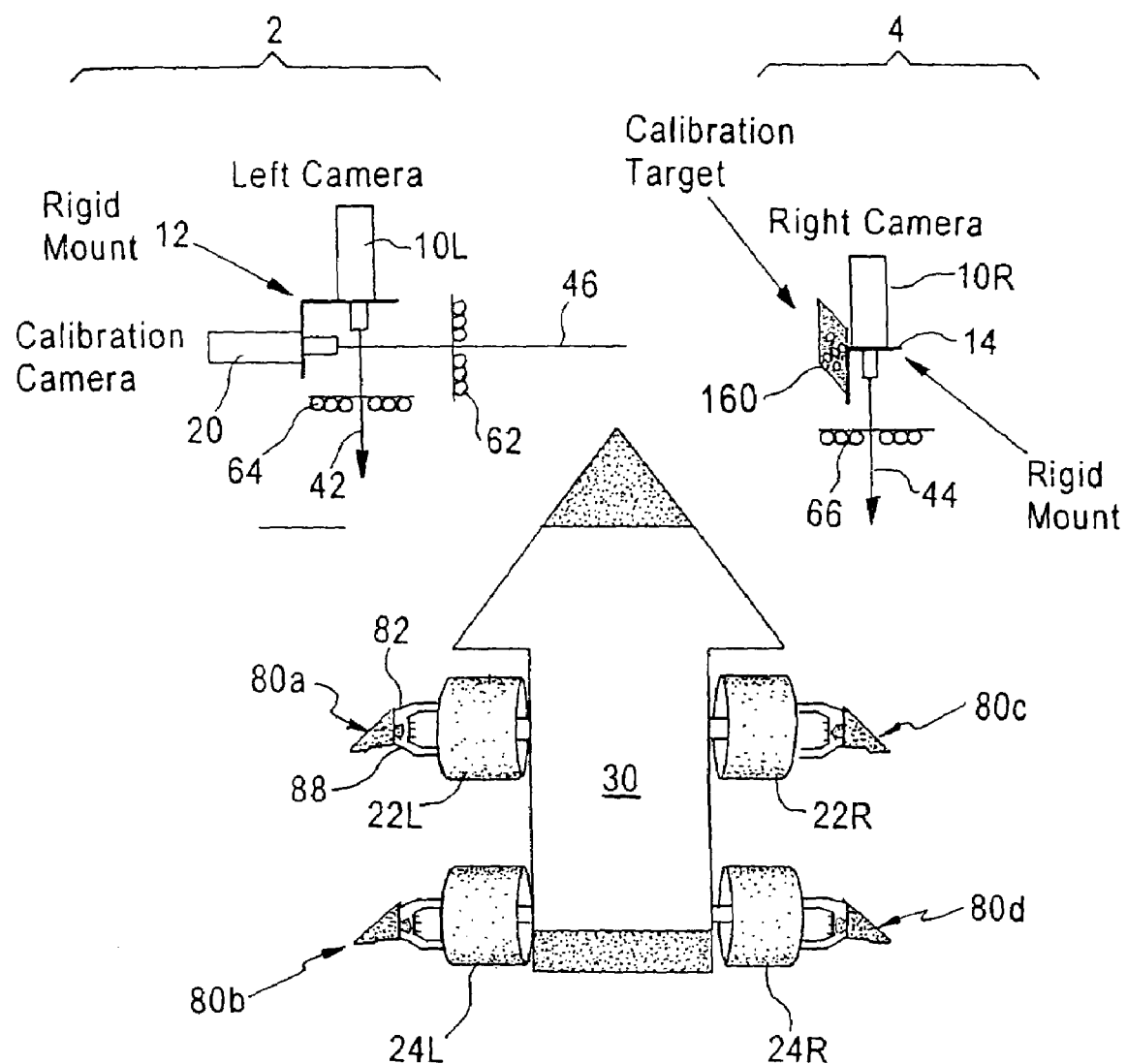
FIG. 1B is a schematic top plan view of an exemplary position determination system.

FIG. 1B is a schematic top plan view of the aligner. Arrow 30 schematically represents a motor vehicle undergoing alignment. The vehicle includes left and right front wheels 22L, 22R and left and right rear wheels 24L, 24R. An alignment target 80a, 80b, 80c, 80d is secured to each of the wheels 22L, 22R, 24L, 24R, respectively. Each alignment target generally comprises a plate 82 on which alignment target information is imprinted and a clamping mechanism 88 for securing the alignment target to a wheel. The terms "left" and "right" are for illustration purpose only, and are not intended to require a particular element to be located in a particular location or relationship with respect to another element.

The left measurement module 2 comprises a left alignment camera 10L and a calibration camera 20. Left alignment camera 10L faces the vehicle and views the left side alignment targets 80a, 80b along axis 42. Alignment camera 10L is rigidly mounted to left rigid mount 12.

The calibration camera 20 faces the right measurement module 4 and views a calibration target 160 along axis 46. The calibration camera 20 also is affixed rigidly to mount 12. In one embodiment, axis 42 and axis 46 subtend an angle of about 90 degrees; however, this particular angular relationship is not required or necessary.

Right measurement module 4 comprises a right alignment camera 10R that generally faces the vehicle and views the right side alignment targets 80c, 80d along axis 44. Right alignment camera 10R is affixed to a rigid alignment camera mount 14. Calibration target 160 is rigidly affixed to alignment camera mount 14 in a position visible to calibration camera 20 along axis 46.

Although calibration camera 20 is illustrated as forming a part of left measurement a module 2 and the calibration target 160 as part of right measurement module 4, the positions of the calibration camera 20 and the calibration target 160 can be switched.

Calibration camera 20 and left alignment camera 10L are fixed in pre-determined, known relative positions. Similarly, right alignment camera 10R and the calibration target 160 are fixed in pre-determined, known relative positions. Thus, the relative position of calibration camera 10 to left alignment camera 10L is known, and the relative position of right alignment camera 10R to calibration target 160 is also known.

The mounting of left alignment camera 10L and calibration camera 20 to left mount 12 is stable to avoid introduction of calibration errors. Similarly, the mounting of right alignment camera 10R and calibration target 160 to mount 14 is required to be stable.

Optionally, left measurement module 2 and right measurement module 4 may further comprise light sources 62, 64, 66 to illuminate the calibration target 160 and wheel alignment targets 80a–80d. In one embodiment, a first light source 62 is aligned perpendicular to axis 46 to direct light along that axis to illuminate calibration target 160; a second light source 64 is aligned perpendicular to axis 42 to direct light along that axis to illuminate left side wheel alignment targets 80a, 80b; and a third light source 66 is aligned perpendicular to axis 44 to direct light along that axis to illuminate right side wheel alignment targets 80c, 80d. In one embodiment, each of the light sources 62, 64, 66 comprises a circuit board or other substrate on which a plurality of light-emitting diodes (LEDs) are mounted, facing the direction of illumination. However, any other light source may be used.

Depending on different dimensions of vehicles under alignment, the aligner uses a rotation mechanism (not shown) to rotate the alignment cameras 10L, 10R such that the cameras can properly see the alignment targets without the need to remove and/or reinstall the aligner. Examples of the rotation mechanism are described in a co-pending patent application entitled "Self-calibrating Position Determination System," by Jackson et al., application Ser. No. 10/170,401, filed Jun. 14, 2002, which is commonly assigned to the assignee of the present application and incorporated herein by reference.

Figure 1C:
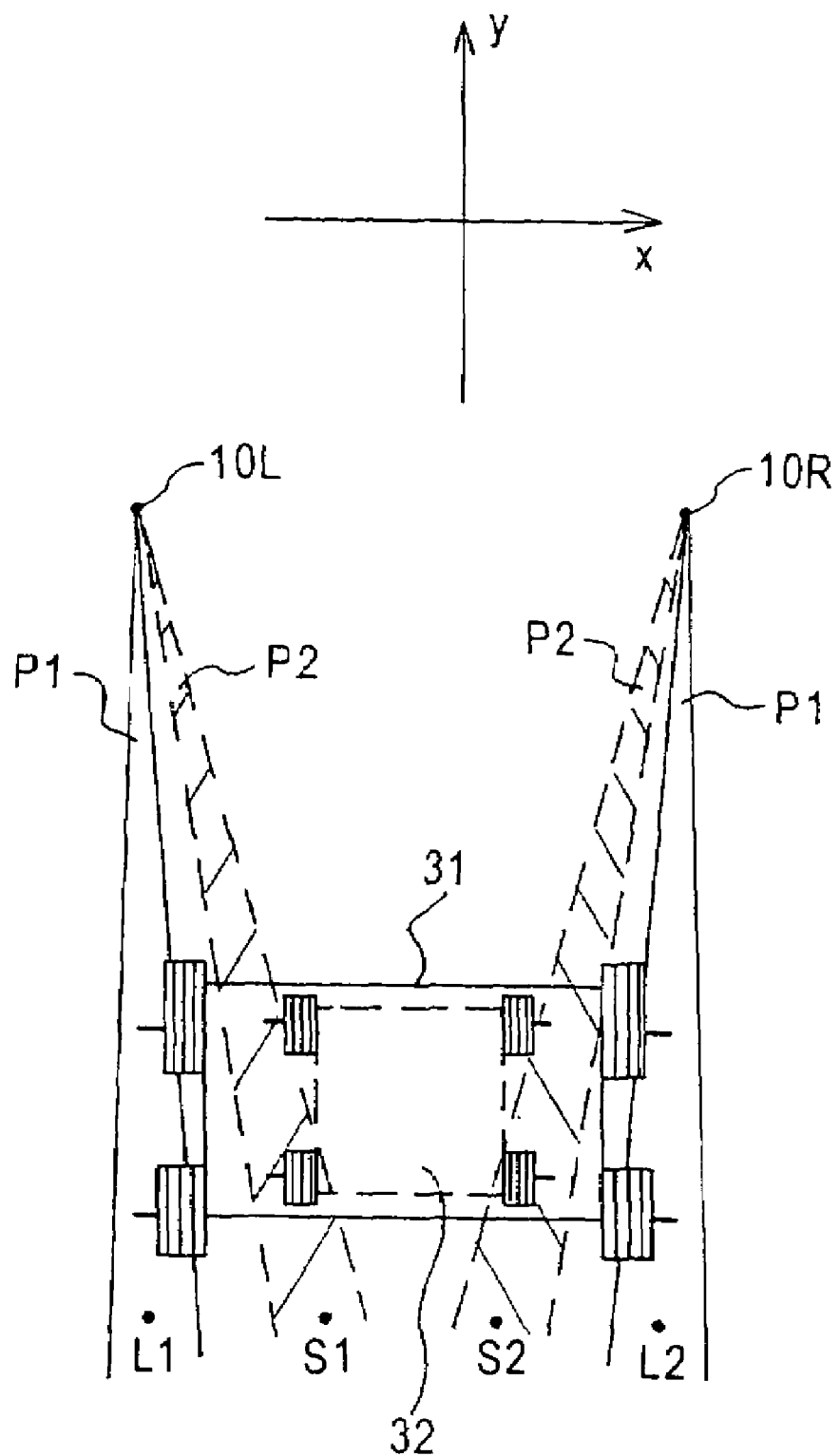
FIG. 1C shows the operation of the exemplary position determination system illustrated in FIG. 1B.

FIG. 1C schematically shows the operation of the aligner when the alignment cameras 10L, 10R are rotated to different orientations or positions. A large vehicle 31 and a small vehicle 32 are shown concurrently to illustrate the difference in the vehicle sizes. The aligner may be operated under a large mode and a small mode. When operated under the large mode, the viewing fields of cameras 10L, 10R are directed to points L1, L2 respectively. When operated under the small mode, the viewing fields of cameras 10L, 10R are directed to points S1, S2 respectively.

Viewing fields P1 represent the viewing fields of alignment cameras 10L, 10R positioned in the large mode to view alignment targets attached to the wheels of the large vehicle 31; and viewing fields P2 represent the viewing fields of alignment cameras 10L, 10R positioned in the small mode to view alignment targets attached to the wheels of the small vehicle 32.

As illustrated in FIG. 1C, if the aligner is set to the large mode, and if a vehicle under alignment is a small vehicle 32, the alignment targets attached to the small vehicle will be outside the viewing fields P1. In response, the rotation mechanism may be used to rotate the viewing fields from P1 to P2 so that the alignment targets fall in the viewing fields of the alignment cameras.

Conversely, if the aligner is set to the small mode, if a vehicle under alignment is a large vehicle 31, the alignment targets attached to the large vehicle will be outside the viewing fields P2. Correspondingly, the rotation mechanism may be used to rotate the viewing fields from P2 to P1 so that the alignment targets fall in the viewing fields of the alignment cameras.

Although the above example uses two operational modes, the small mode and the large mode, to illustrate the operation of the aligner, the cameras may be adjusted such that the viewing fields of the cameras may be positioned towards more than two points.

In addition to using cameras, other sensing devices having directional sensing fields or signal sources with directional signal emitting path may be used to implement the system. For example, the sensing devices may be directional light sensors that sense light from active alignment targets with light sources, such as LEDs. Each light sensor has a limited sensing field for sensing light from a specific direction. In another embodiment, the measurement module may include a light source with LEDs and the alignment targets may include directional light sensors. The sensors on the alignment targets generate positional signals of the light source. Measurements of the relative positions between the measurement modules and the wheels to which the alignment targets attach can be calculated based on the positional signals obtained by the alignment targets.

Detailed structures and operations of self-calibrating position determination systems are also described in a co-pending patent application entitled "Self-Calibrating, Multi-Alignment camera Machine Vision Measuring System," by Jackson et al., Ser. No. 09/576,442, filed on May 22, 2000; and co-pending patent application entitled "Self-Calibrating 3D Machine Vision Measuring System Useful in Motor Vehicle Wheel Alignment," by Jackson et al., Ser. No. 09/928,453, filed Aug. 14, 2001; and co-pending patent application entitled "Self-calibrating Position Determination System," by Jackson et al., application Ser. No. 10/170,401, filed Jun. 14, 2002 (noted previously), all of which are commonly assigned to the assignee of the present application and incorporated herein by reference.

As an option, a sensor is used to detect the rotation of the alignment camera and generate signals representing rotation status of the alignment camera. The signals can be fed to a data processing system and output to a user interface to show the status of rotation. The sensor can be disposed under the alignment camera to determine the rotation angle.

Hardware Overview of the Data Processing System

As discussed above, the aligner includes a data processing system, such as a computer, to conduct numerous tasks, such as processing positional signals, calculating relative positions, providing a user interface to the operator, displaying alignment instructions and results, receiving commands from the operator, sending control signals to rotate the alignment cameras, etc. The data processing system receives positional data from the measurement modules and sends control signals to control the operation of the rotation mechanism.

Figure 2:
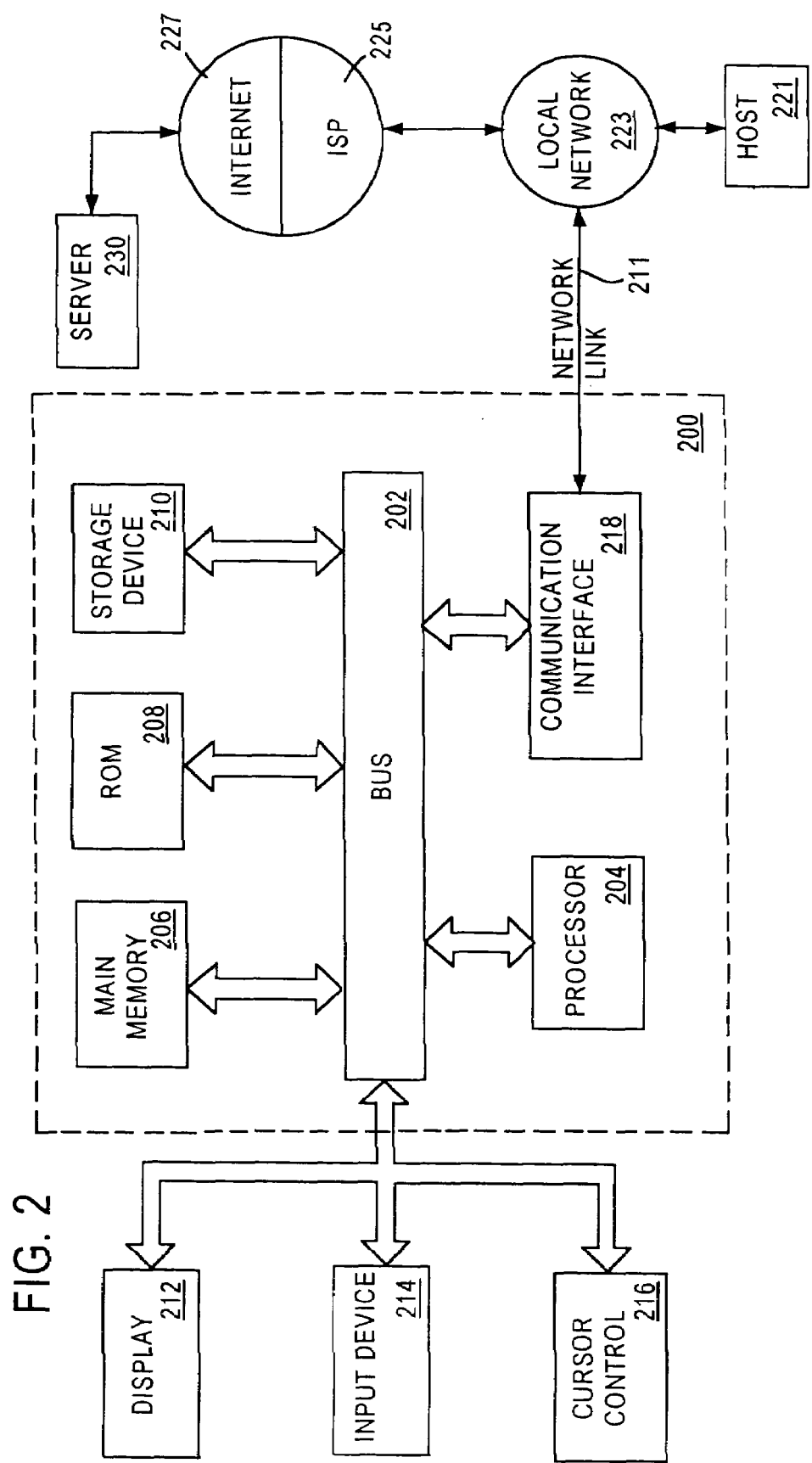
FIG. 2 is a block diagram of a data processing system upon which an exemplary position determination system may be implemented.

FIG. 2 is a block diagram that illustrates an exemplary data processing system 200 upon which an embodiment of the disclosure may be implemented. Data processing system 200 includes a bus 202 or other communication mechanism for communicating information, and a processor 204 coupled with bus 202 for processing information. Data processing system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Data processing system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Data processing system 200 may be coupled via bus 202 to a display 212, such as a cathode ray tube (CRT), for displaying information to an operator. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212.

The data processing system 200 is controlled in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the disclosure. Thus, embodiments of the disclosure are not limited to any specific combination of hardware circuitry and software.

The term "machine readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a data processing system can read.

Various forms of machine-readable media may be involved in carrying one or more sequences of one or more instructions to processor 204 for execution. For example, the instructions may initially be carried on a magnetic disk of a remote data processing. The remote data processing system can load the instructions into its dynamic memory and send the instructions over a telephone line using a modem. A modem local to data processing system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Data processing system 200 also includes a communication interface 218 coupled to bus 202. Communication interface 218 provides a two-way data communication coupling to a network link 211 that is connected to a local network 223. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 211 may provide a connection through local network 223 to a host data processing system 221 or to data equipment operated by an Internet Service Provider (ISP) 225. ISP 225 in turn provides data communication services through the world large packet data communication network now commonly referred to as the "Internet" 227. Local network 223 and Internet 227 both use electrical, electromagnetic or optical signals that carry digital data streams. The signals through the various networks and the signals on network link 220 and through communication interface 218, which carry the digital data to and from data processing system 200, are exemplary forms of carrier waves transporting the information.

Data processing system 200 can send messages and receive data, including program code, through the network (s), network link 211 and communication interface 218. In the Internet example, a server 230 might transmit a requested code for an application program through Internet 227, ISP 225, local network 223 and communication interface 212. In accordance with embodiments of the disclosure, one such downloaded application provides for automatic calibration of an aligner as described herein.

The data processing also has various signal input/output ports (not shown in the drawing) for connecting to and communicating with peripheral devices, such as USB port, PS/2 port, serial port, parallel port, IEEE-1324 port, infra red communication port, etc., or other proprietary ports. The measurement modules may communicate with the data processing system via such signal input/output ports.

User Interface Overview

Figure 3:
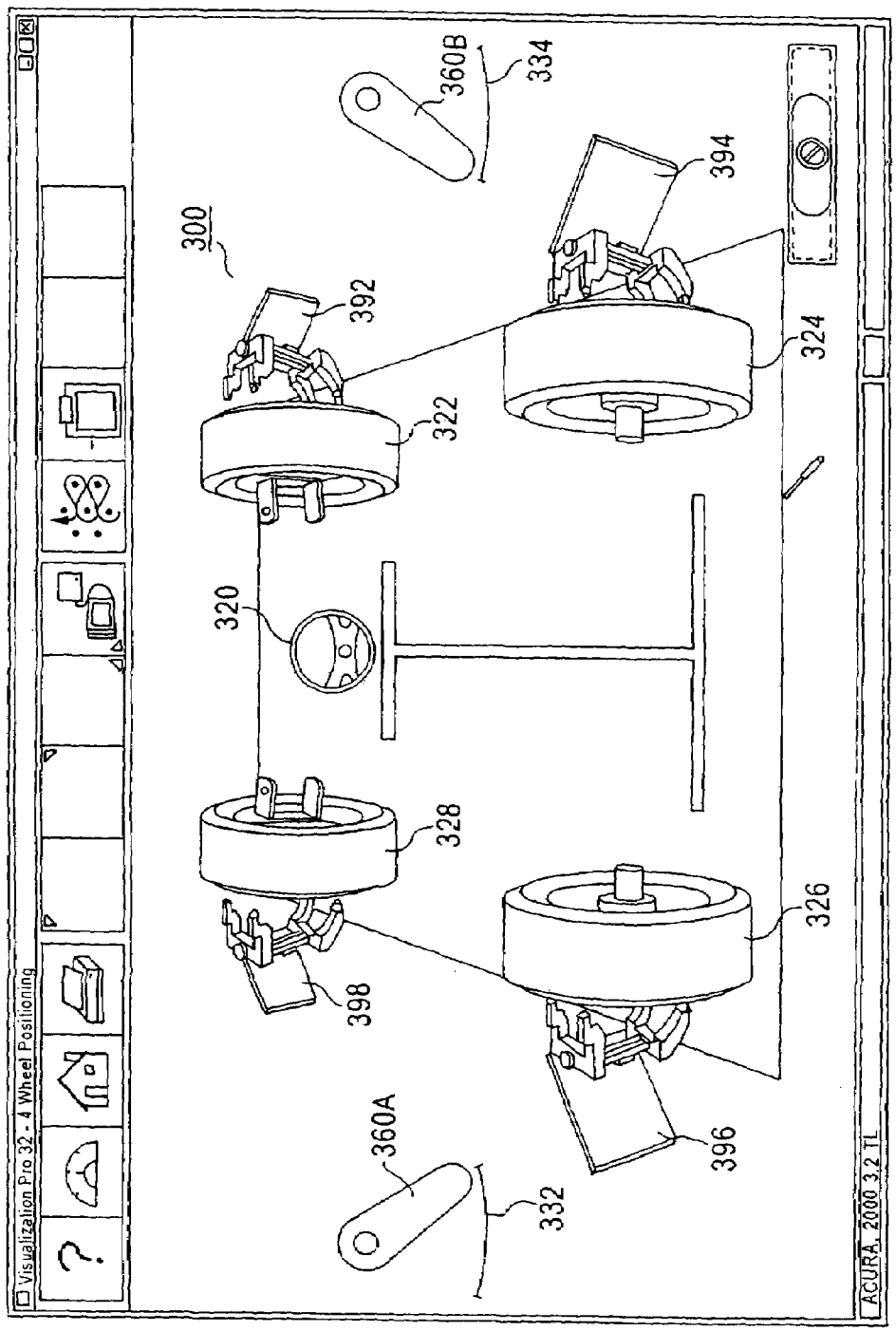
FIG. 3 shows an exemplary user interface of the position determination system.

The data processing system provides a user interface to communicate with and solicit input from an operator. FIG. 3 shows an exemplary user interface. The upper portion of the screen provides various clickable command buttons representing different functions to solicit input command from the operator. The vehicle 300 has a steering wheel 320, wheels 322, 324, 326, 328. Alignment targets 392, 394, 396, 398 are shown with the wheels.

As shown in FIG. 1C, the alignment cameras may be adjusted or rotated from a large mode to a small mode (P1 to P2) or vice versa. The user interface provides two alignment camera position indicators 332, 334 to show respective positions of the alignment cameras' viewing fields. Two needles 360A, 360B represent respective positions of the alignment cameras. When the alignment cameras rotate toward a new direction, the needles 360A, 360B move to indicate such changes correspondingly.

Determination of Alignment Camera Positions

As discussed earlier, the alignment cameras 10L, 10R are rigidly linked to the calibration camera 20 and the calibration target 160 respectively. Thus, the positional relationships between the left alignment camera 10L and the calibration camera 20, and the right alignment camera 10R and the calibration target 160 are fixed. When the alignment cameras 10L, 10R rotate, the calibration target 160 and/or the calibration camera 20 also rotate along with the alignment cameras 10L, 10R. The rotation of the calibration cameras/target causes changes in the positional relationship between the calibration camera 20 and the calibration target 160.

It is observed that the positions of the alignment cameras 10L, 10R can be determined by comparing the current positional relationship between the calibration target 160 and calibration camera 20 with those of a plurality of reference positions. In one embodiment, the data processing system stores a set of reference data corresponding to the positional relationship between the calibration target 160 and calibration camera 20 when the left alignment camera 10L and the right alignment camera 10R are respectively positioned at a plurality of discrete reference positions. Methods and algorithms for obtaining the reference data will be described shortly. The discrete reference positions are positions to which the alignment cameras 10L, 10R may respectively rotate. For example, the alignment cameras 10L, 10R can be respectively rotated to three reference positions: large, medium, and small. As illustrated in FIG. 1B, the small position is when the alignment camera is pointing towards the center of the vehicle; the large position is when the alignment camera is pointing away from center of the vehicle; and the medium position is when the alignment camera is pointing towards a point somewhere between the large position and the small position.

In this case, the reference data may include nine data items that correspond to the nine possible combinations of the reference positions. The nine possible combinations of the left alignment camera 10L and the right alignment camera 10R are as follows:

TABLE 1

| | |
|---|---|
| Left Small | Right Small |
| Left Small | Right Medium |
| Left Small | Right Large |
| Left Medium | Right Small |
| Left Medium | Right Medium |
| Left Medium | Right Large |
| Left Large | Right Small |
| Left Large | Right Medium |
| Left Large | Right Large |

After the data processing system has obtained the current positional relationship between the calibration camera 10 and the calibration target 160, the data processing system identifies the closest reference data item to the current positional relationship.

In one embodiment, the data processing system indicates the current alignment camera position as the position represented by the closest reference position, that is, one of the nine combinations illustrated in Table 1. Thus, each of the needles 360A and 360B will point to only one of the three possible positions: small, medium and large. Accordingly, the current positions of the alignment cameras are indicated in a discrete format.

In another embodiment, after the data processing system obtains the current positional relationship between the calibration camera 10 and the calibration target 160, the data processing system identifies two reference data items that are the closest to the current positional relationship. The data processing system then indicates the position of the alignment cameras by interpolating between the two combinations represented by the two closest data items. The interpolation may be based on the value of difference between the current positional relationship and the data items. As a result, the needles 360A or 360B may, for example, indicate the position of alignment camera as somewhere between the large position and the small position in a continuous format.

Other methods for determining positions based on reference data that are know to people skill in the art can also be used to indicate the current position of the alignment cameras.

In the above examples, the number of the reference positions is used for illustration purpose only. Other number of reference positions may be used depending on system needs and design. The more reference positions used, the higher the resolution of position indication. However, using more reference positions also means more calculation and higher demand on computation power from the system.

Figure 4:
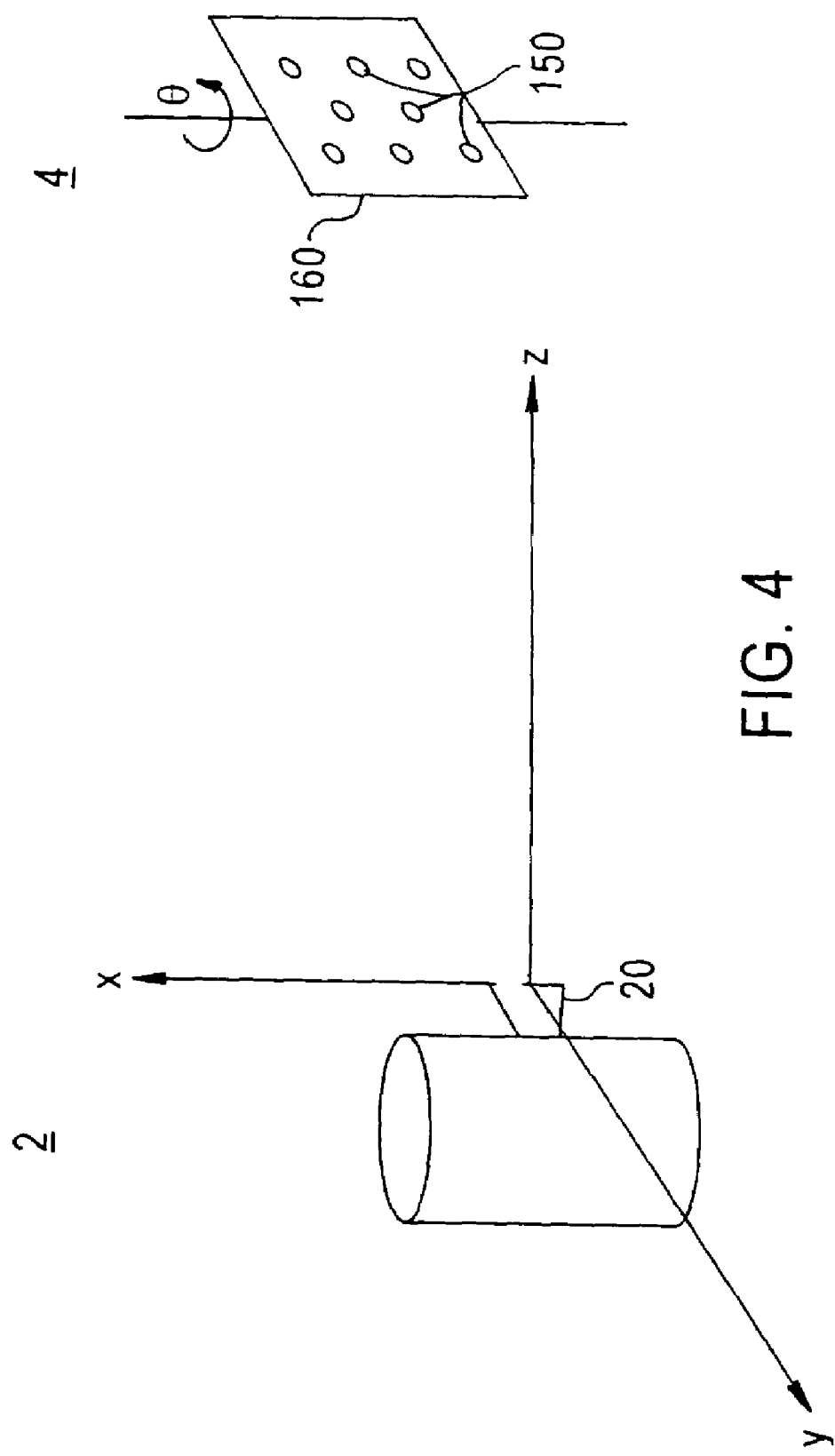
FIG. 4 depicts the relative positional relationship between the calibration camera and the calibration target.

FIG. 4 illustrates the relative positional relationship between the calibration camera 20 and the calibration target 160. The calibration camera 20 aims at the calibration target 160 and obtains image signals of the target patterns 150 of the calibration target 160. When the alignment cameras rotate, the calibration camera and/or the calibration target also rotate with their respective alignment cameras. The calibration camera 20 has a reference coordinate system comprising X-Y-Z axes. The X-axis (the vertical axis) may be an axis perpendicular to the surface upon which the measurement modules installed (the horizontal surface) and formed by the Y and Z axes. The calibration camera 20 and the calibration target 160 may rotate relative to the X-axis. Angle θ represents the angle of rotation measured the calibration camera. The calibration camera also measures displacements of the calibration target relative to three coordination axes during the rotations of the alignment cameras. The coordination system and parameters are used for illustration only. Other coordination systems and parameters may be used to define the positions of the calibration camera and target.

The data processing system calculates angle θ and the position on the Y-axis (Y-value) of the calibration target 160 based on image signals generated by the calibration camera 20. When the relative position of the calibration camera 20 and calibration target 160 changes, the shapes of the target patterns 150 viewed by the calibration camera also change. In addition, when relative position between the calibration camera 20 and the calibration target 160 changes, the location where the calibration target 160 falls in the viewing field of the calibration camera 20 may also change.

Based on the changes of the target patterns 150 and the displacement of the target image within the viewing field, angle θ and the position on the Y-axis (Y-value) can be determined. Methods and systems for determining these positional parameters are described in U.S. Pat. No. 5,724,743, titled "Method and apparatus for determining the alignment of motor vehicle wheels," U.S. Pat. No. 5,535,522, titled "Method and apparatus for determining the alignment of motor vehicle wheels," and U.S. Pat. No. 5,809,658, entitled "Method and Apparatus for Calibrating Alignment Cameras Used in the Alignment of Motor Vehicle Wheels," all of which are commonly assigned to the assignee of the present disclosure and incorporated herein for reference.

It is observed that if the left alignment camera 10L and the calibration camera 20 are kept stationary, the rotation of the right alignment camera 10R and the calibration target 160 causes changes in angle θ only. The position of the calibration target 160 in the viewing field of the calibration camera 20, i.e., the position on the Y-axis (Y-value), remains substantially unchanged.

On the other hand, when the left alignment camera 10L rotates, the rotation causes changes in both the value of angle θ and position of the calibration target 160 in the viewing field of the calibration camera 20, i.e., the position on the Y-axis (Y-value).

Thus, the positional relationship between the calibration camera 20 and the calibration target 160 can be defined with angle θ and the linear translations on the Y-axis (Y-value). Since the positional relationships between the left alignment camera 10L and the calibration camera 20, and the right alignment camera 10R and the calibration target 160 are known and fixed, the changes in angle θ and the position on the Y-axis (Y-value) can be used to indicate the position of the calibration cameras.

Reference Data Determination Process

As discussed above, the system uses reference data to determine the current position of the alignment cameras 10L, 10R. In one example, the reference data correspond to the positional relationships between the calibration target 160 and calibration camera 20 when the left alignment camera 10L and the right alignment camera 10R are respectively positioned on one of a plurality of reference positions. The system uses an advanced reference data determination process to obtain positional relationships for all possible combinations of reference positions. The process may be described with the following example:

Assuming the system uses three reference positions: small, medium and large for each alignment camera, there are nine possible position combinations when the alignment cameras are positioned at their respective reference positions:

| | |
|---|---|
| 1) Left Small | Right Small |
| 2) Left Small | Right Medium |
| 3) Left Small | Right Large |
| 4) Left Medium | Right Small |
| 5) Left Medium | Right Medium |
| 6) Left Medium | Right Large |
| 7) Left Large | Right Small |
| 8) Left Large | Right Medium |
| 9) Left Large | Right Large |

In order to obtain all the positional relationships between the calibration camera 20 and the calibration target 160, conventionally, the alignment cameras have to be rotated and positioned to their respective reference positions and have the positional relationships between the calibration camera 20 and the calibration target 160 measured. The self-calibrating position determination system, however, uses an advanced algorithm that can obtain the positional relationships for all the reference positions by making only five measurements. According to the algorithm, it is observed that the nine possible combinations of the reference positions can be divided into five groups as follows:

TABLE 2

| GROUP | COMBINATION | ANGLE θ | Y VALUE |
|---|---|---|---|
| (a) | Left Medium-Right Small | θ1 | Ym |
| | Left Small-Right Medium | θ1 | Ys |
| (b) | Left Large-Right Small | θ2 | Yl |
| | Left Small-Right Large | θ2 | Ys |
| | Left Medium-Right Medium | θ2 | Ym |
| (c) | Left Large-Right Medium | θ3 | Yl |
| | Left Medium-Right Large | θ3 | Ym |
| (d) | Left Small-Right Small | θ4 | Ys |
| (e) | Left Large-Right Large | θ5 | Yl |

According to Table 2, the angles within each group are the same. For example, the values of angle θ in group (b) are all θ2, and the values of angle θ in group (c) are all θ3. It is further observed that the Y-value for each combination of reference positions is dependent on the position of the left alignment camera. For example, when the left alignment camera is positioned at the small position, the Y-value is always Ys; and if the left alignment camera is positioned at the large position, the Y-value is always Yl. Thus, there are only five possible values for angle θ and three possible values for the Y-value.

The system uses a reference data determination process to obtain all the nine possible positional relationships by making measurements at only five reference points. According to the process, the system measures the following five positional relationships:

Measurement 1: one measurement from group (a);

Measurement 2: one measurement from group (b);

Measurement 3: one measurement from group (c);

Measurement 4: measurement of group (d); and

Measurement 5: measurement of group (e)

wherein the measurements among Measurement 1, Measurement 2 and Measurement 3 have to include at least one measurement with the left alignment camera positioned at the medium position.

After the process, five measurements are obtained:

TABLE 3

| GROUP | ANGLE θ | Y VALUE |
|---|---|---|
| (a) | θ1 | Ym and others |
| (b) | θ2 | |
| (c) | θ3 | |
| (d) | θ4 | Ys |
| (e) | θ5 | Yl |

Thus, after the process, all the five possible values for angle θ and three possible values of Y-value are all known. Values that are not measured during the process can now be obtained by introducing the known values back to Table 2. For instance, if the unmeasured combinations are Left Small-Right Medium, Left Large-Right Small, and Left Small-Right Large, the known values θ1, θ2, Ys and Yl can be introduced to obtain their respective values (θ1, Ys), (θ2, Yl) and (θ2, Ys). Therefore, all the nine possible positional relationships are now known by extrapolation. Since the system obtains the reference data by positioning the alignment cameras on only some of the reference positions, the reference data determination process saves time and system resource, and hence the system efficiency is improved.

The above example uses three reference positions for illustration purpose only. The number of reference points is not limited to three. Other number of reference positions can also be used by following the process described above. It has been observed that for n reference positions (n is a natural number not smaller than 2), the number of required measurement points is (2n−1).

Figure 5A:
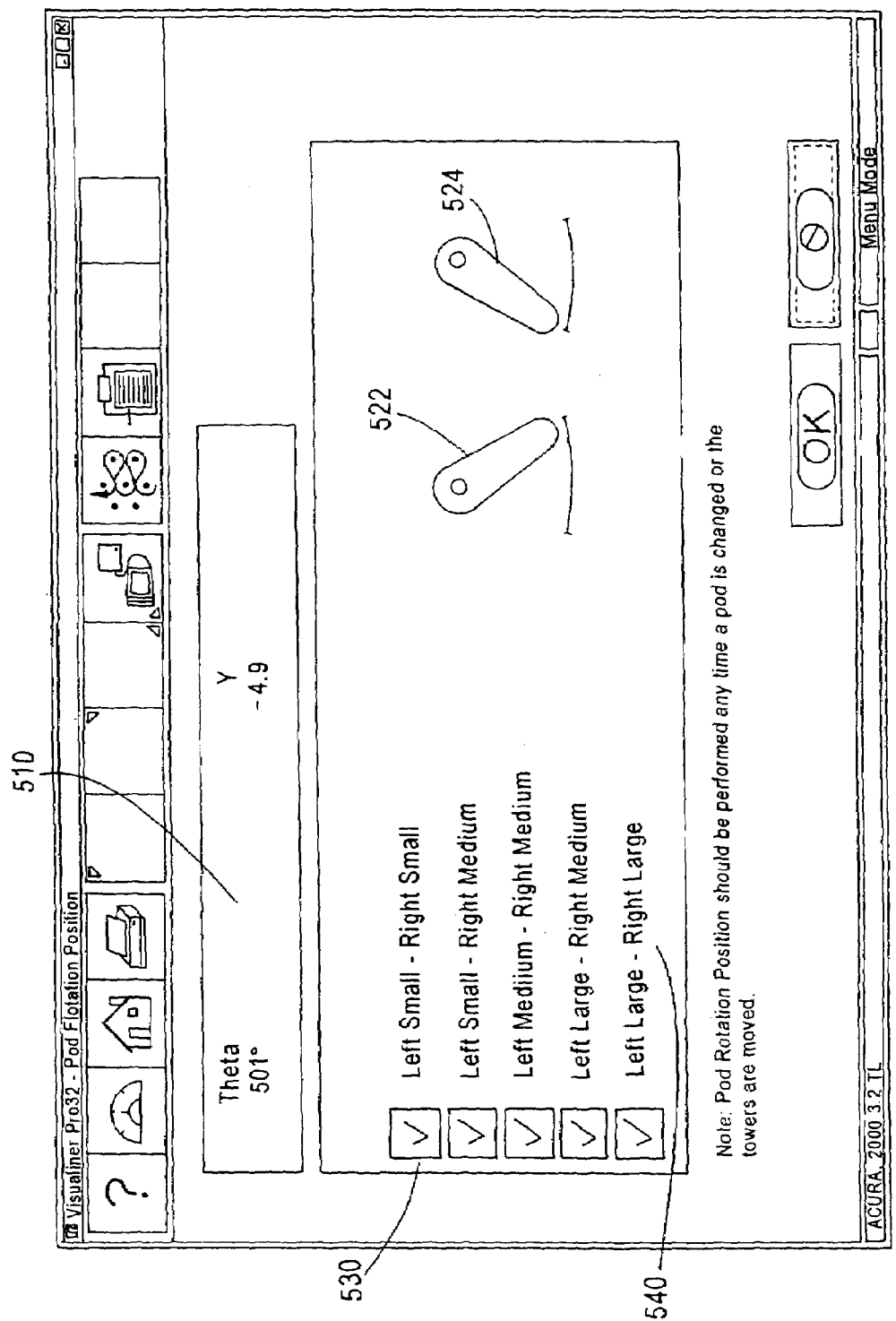
FIGS. 5A–5F are screenshots of an exemplary user interface used during the reference data determination process.

FIGS. 5A–5F show a user interface used by the system for guiding a user to obtain the five measurements. In FIG. 5A, area 510 shows the current measurements of angle θ and Y-values. Area 530 indicates whether measurements have been made. Area 540 lists alignment camera positions that measurements need to be made. Needles 522 and 524 show the positions to place the alignment cameras in order to conduct the undergoing measurement listed in area 530.

Figure 5B:
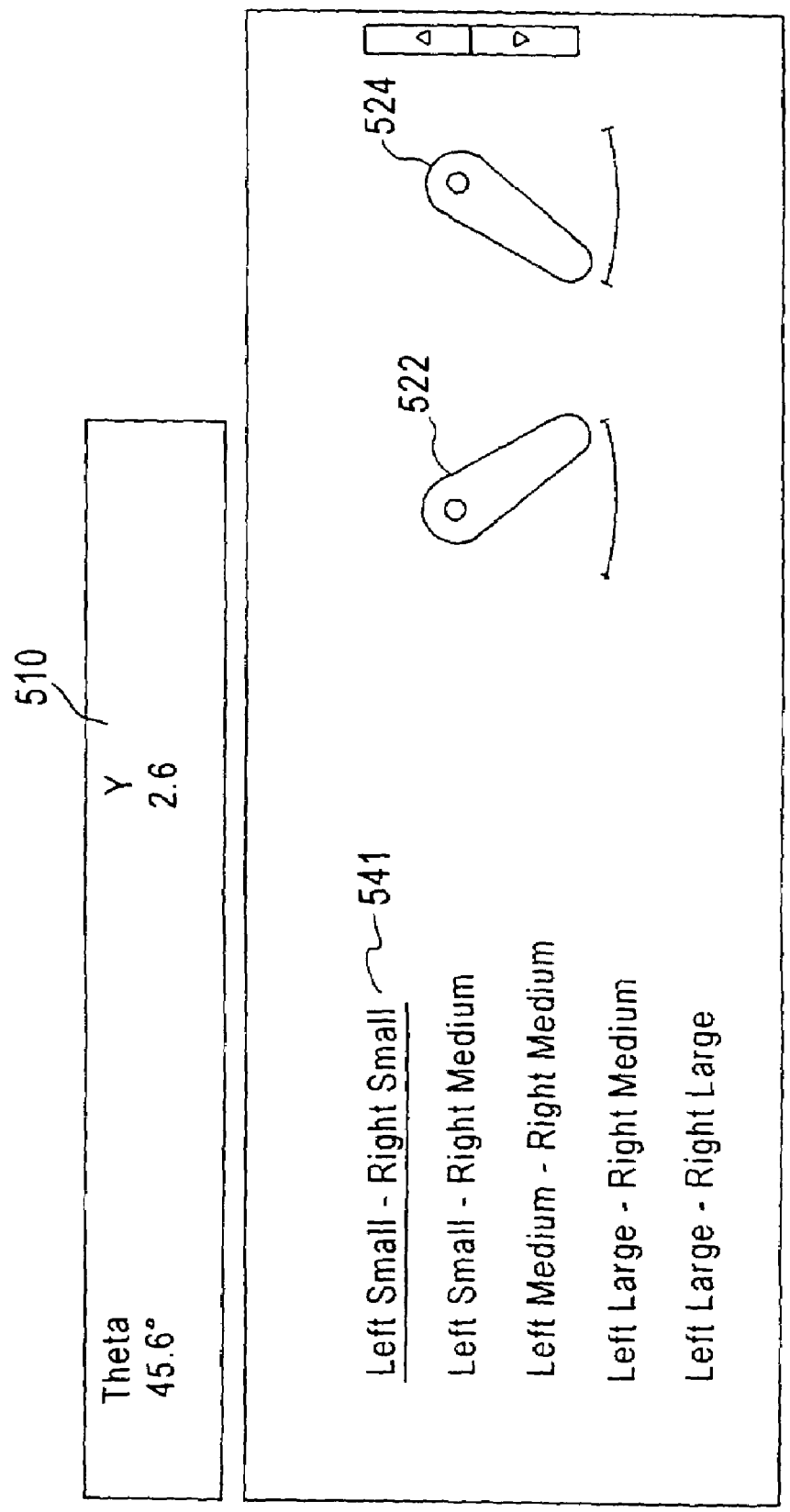

FIGS. 5B–5F show step-by-step screenshots of the user interface. In FIG. 5B, bolded item 541 shows the alignment camera positions of the undergoing measurement. Grey-out items indicate that measurements have not yet been made. Needles 522 and 524 show the positions in which the alignment cameras should be placed according to the combination shown in item 541. Area 510 shows the current measurements of angle θ and Y-values. The user is asked to relate rotate the alignment cameras 10L, 10R to the position indicated by the needles 522, 524. The user is asked to click the OK button once the cameras are rotated to the designated positions. The measurements taken at this position will be stored in a data storage device for the listed reference position.

Figure 5C:
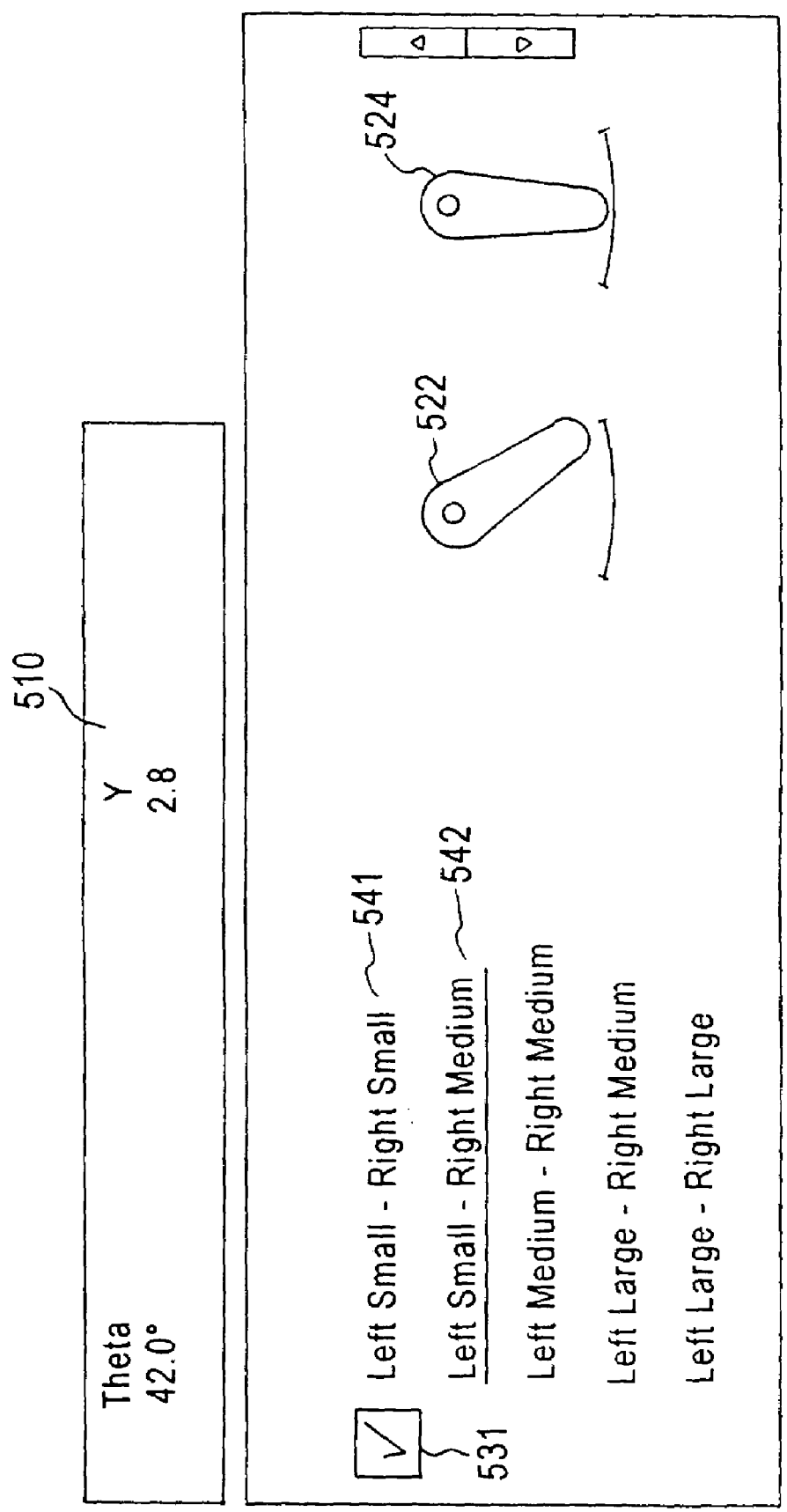
Figure 5D:
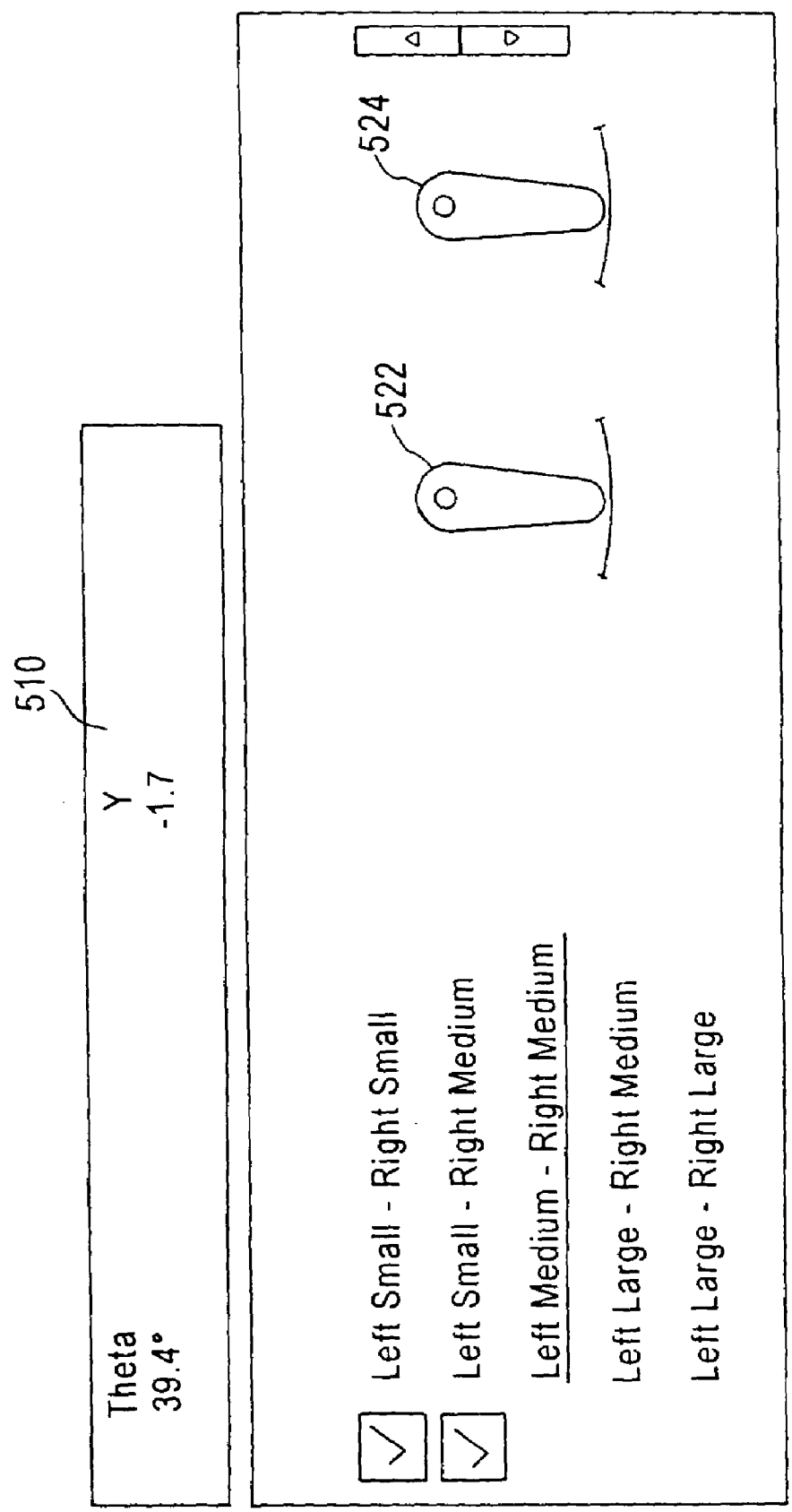
Figure 5E:
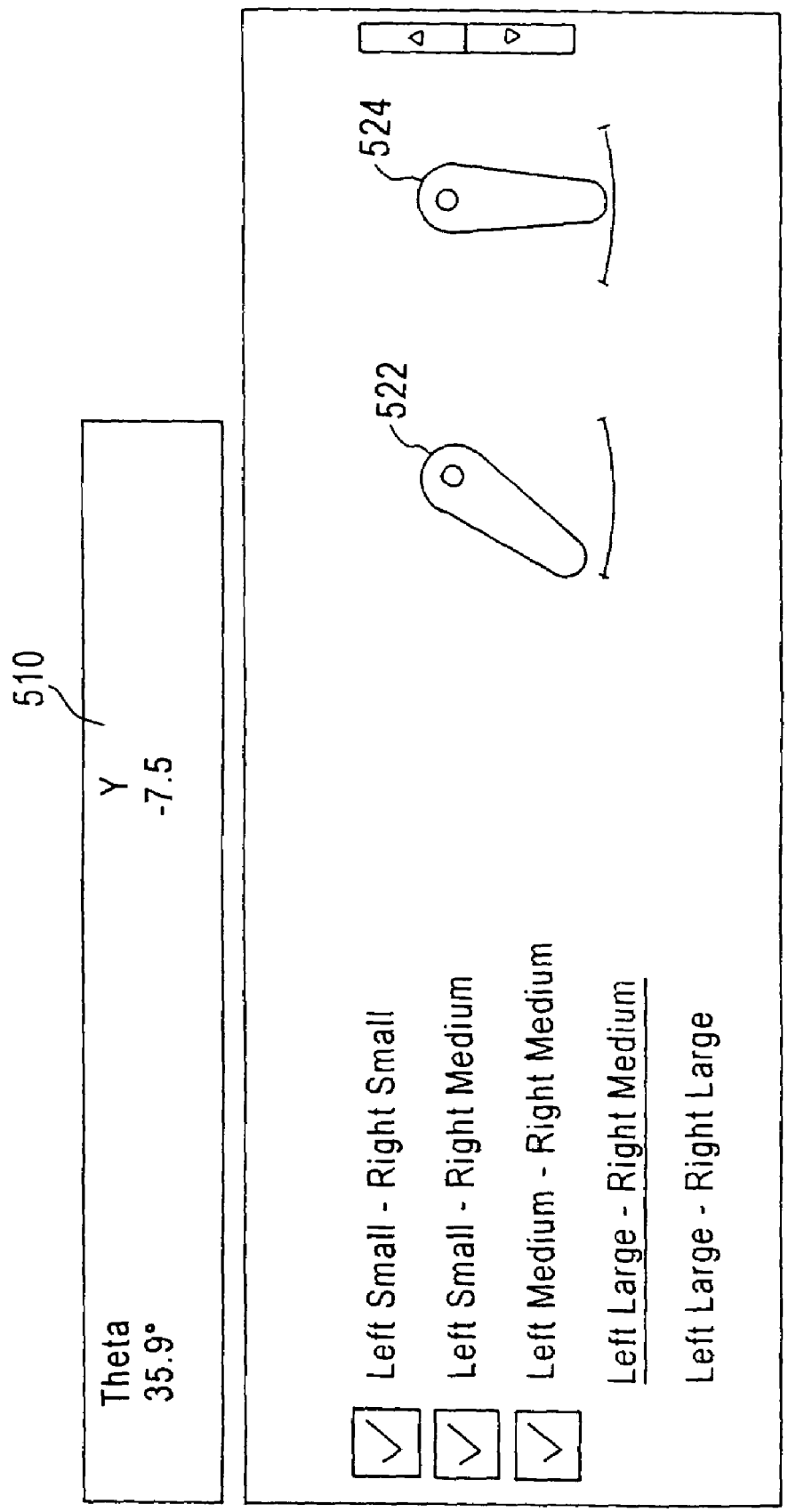
Figure 5F:
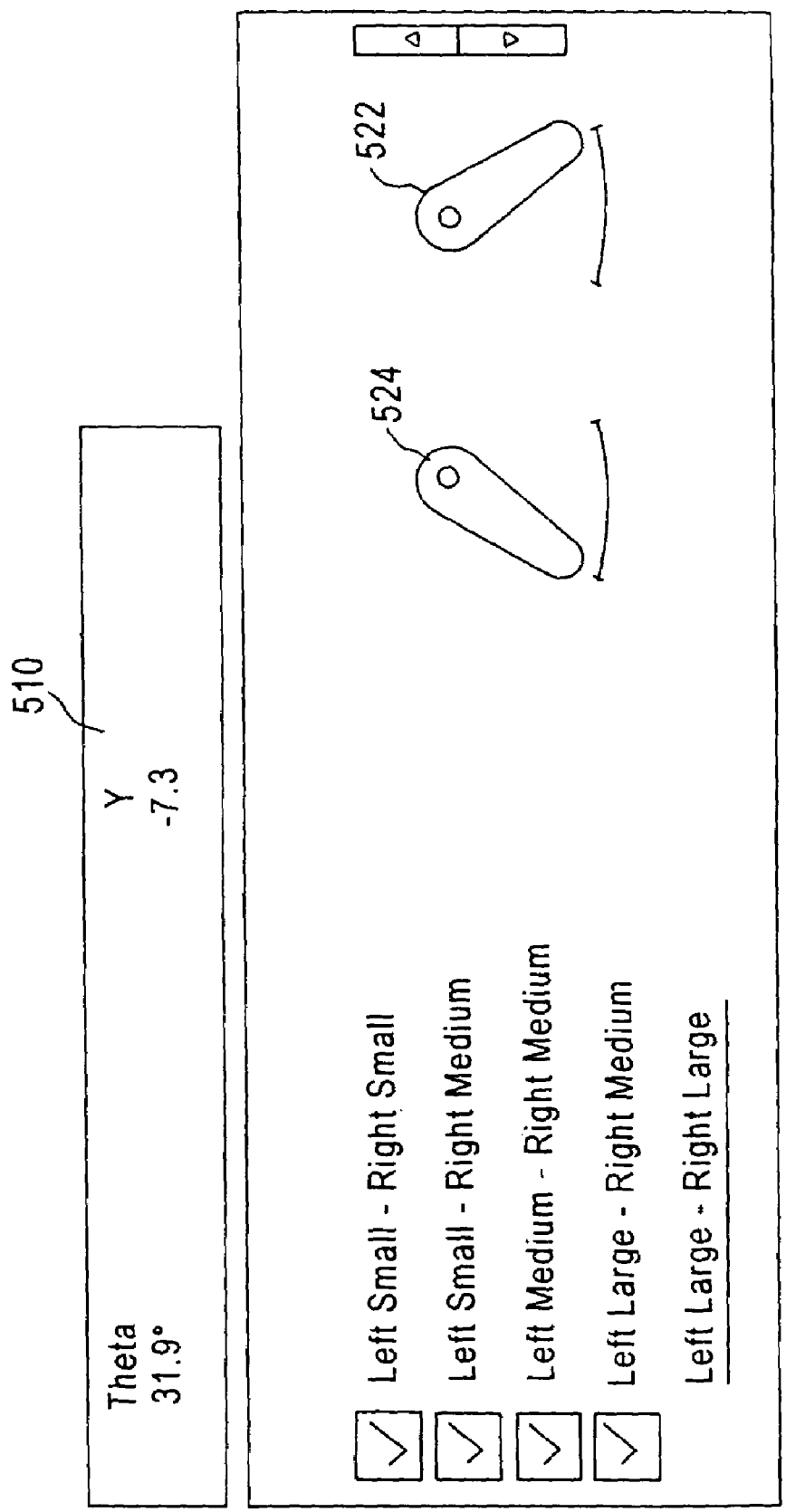

In FIG. 5C, check 531 indicates the measurement for item 541 has been taken. Item 542 shows the undergoing measurement. Needles 522 and 524 indicate the positions where the alignment cameras should be placed in order to take the measurement for item 542. Similar to the previous screens, area 510 shows the current readings of measurements of angle θ and Y-values. Similarly, FIGS. 5D–5F show the screenshots during taking the rest of the measurements.

Figure 6:
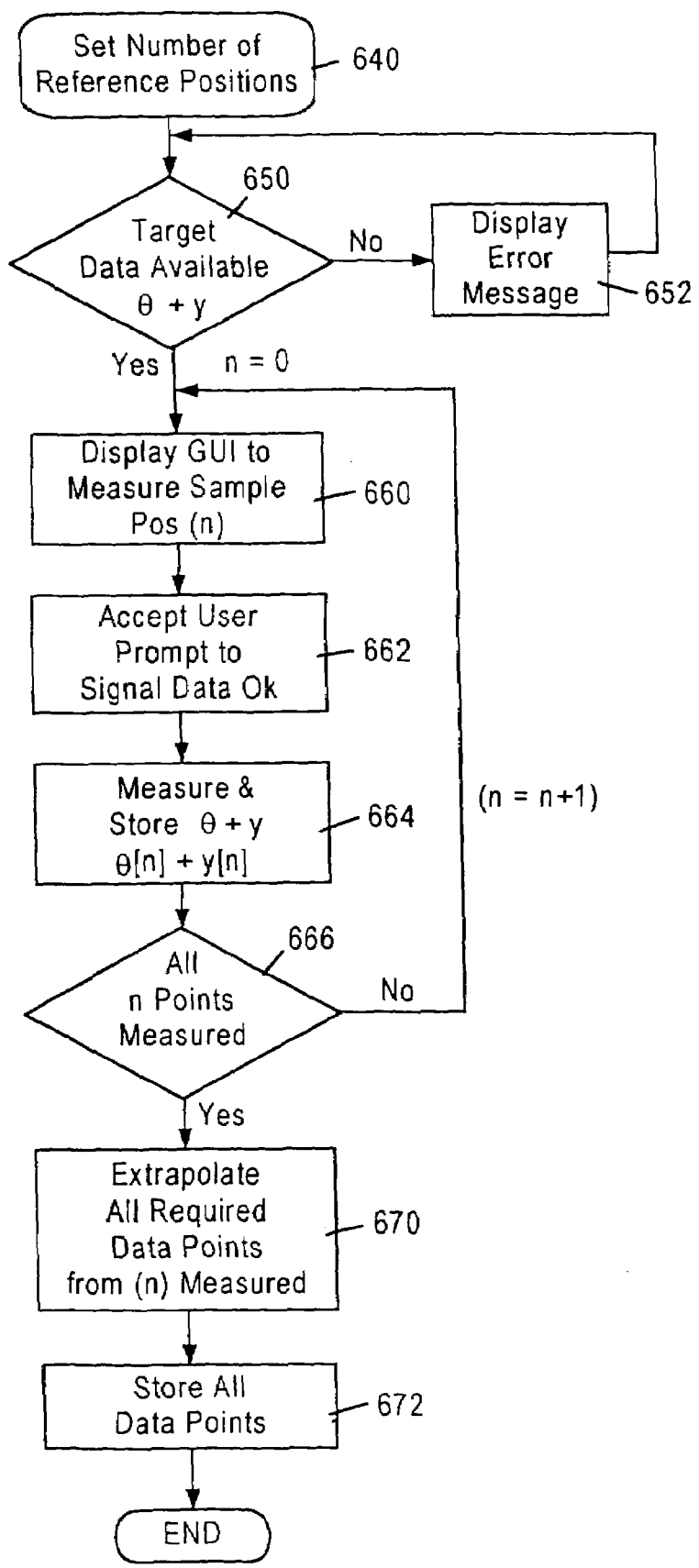
FIG. 6 is a flow chart showing the steps of obtaining the reference data.

FIG. 6 is a flow chart showing the steps of obtaining the reference data by making measurements for less than all the reference positions. Step 640 sets the number of reference positions for each alignment camera. Step 640 determines whether image data from the calibration target is available. If no image data is available, an error message is shown (step 652). Otherwise, counter n is set as zero and the user interface is displayed as shown in FIGS. 5A–5F (steps 660–664). If all the needed measurements are obtained, the system extrapolates the reference data based on the obtained measurements (step 670) and stored the reference data in the data storage device (step 672).

Figure 7:
FIG. 7 shows real measurements of θ and Y-value when the alignment cameras respectively rotated to each of the reference positions.
Figure 7:
Figure 7:
Figure 7:
Figure 7:
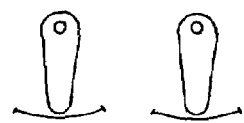
Figure 7:
Figure 7:
Figure 7:
Figure 7:

For purpose of comparison, FIG. 7 shows real measurements of θ and Y-value when the alignment cameras respectively rotated to each of the reference positions. From FIG. 7, it is noted that the measurements for Y-values can be divided into three groups, each has similar values: (Ym: −2.8, −2.6, −2.4), (Ys: 3.0, 3.2, 2.8), and (Yl: −8.0, −7.8, −7.6). And measurements for θ can be categorized into five groups, each has similar values: (θ1: 42.4, 41.6), (θ2: 39.3, 38.3, 38.6), (θ3: 35.5, 34.9), (θ4: 31.7), and (θ5: 45.7). Although the values of Y-values and θ within each group may not be identical, the variations are insignificant and can be ignored for purpose of extrapolation and position indication. FIG. 7 perfectly illustrates the effectiveness of the algorithm.

Figure 8:
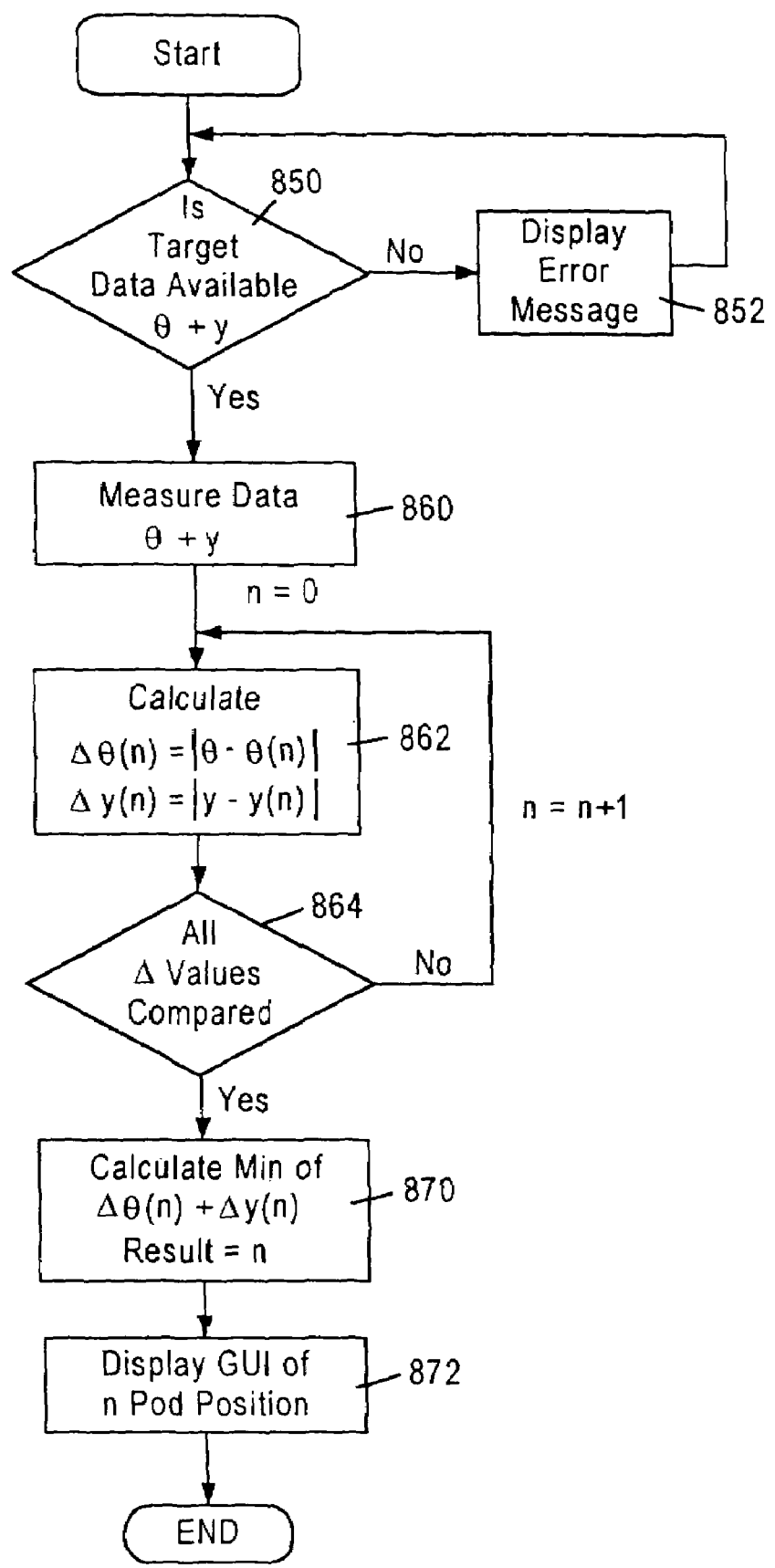
FIG. 8 illustrates a flow chart indicating the current position of the alignment cameras based on the reference data.

FIG. 8 illustrates an example of indicating the current position of the alignment cameras based on the reference data. The position determination system measures the current angle θ and Y-value of the calibration target relative to the calibration camera (step 860). The current angle θ and Y-value is then compared with the reference data by calculating the absolute value of the angle difference, Δθ, and the Y-value difference, ΔY, for each of the reference positions (steps 862, 864). The system then calculates the sum of the absolute values of Δθ and ΔY, and determines which reference position has the smallest sum (step 870). The reference position with the smallest sum is then identified. The position of the alignment cameras is then identified as the reference position that has the smallest sum.

Other techniques, such as interpolation, that are known to people skilled in the art to determine relative positions based on reference positions may also be used for indicating the current position of the alignment cameras.

It is to be noted that the system has to conduct a new reference data determination process each time the physical locations of the measuring modules or the equipment used therein are changed.

The disclosure has been described with reference to specific embodiments thereof. It will, however, be evident that various modifications and changes may be made thereto without departing from the broader spirit and scope of the disclosure. The specification and drawings are, accordingly, to be regarded in an illustrative rather than a restrictive sense.

What is claimed is:

1. A position determination system, comprising:
  a first measuring module, including
    a first sensing device for obtaining positional data of a first testing target relative to the first sensing device;
    a calibration sensing device rigidly linked to the first sensing device, wherein the positional relationship between the first sensing device and the calibration sensing device is known; and
    a first rotation mechanism for rotating the first sensing device without altering the positional relationship between the first sensing device and the calibration sensing device;
  a second measuring module, including
    a second sensing device for obtaining positional data of a second testing target relative to the second sensing device;

a calibration target for use with the calibration sensing device to obtain positional data of the calibration target relative to the calibration sensing device, wherein the calibration target is rigidly linked to the second sensing device, and the positional relationship between the second sensing device and the calibration target is known; and a second rotation mechanism for rotating the second sensing device without altering the positional relationship between the second sensing device and the calibration target; and a data processing system coupled to the first and second measuring modules and configured to provide a user interface indicating positions of the first sensing device and the second sensing device.

2. The system of claim 1, wherein the data processing system is configured for carrying out the machine-implemented steps of:

receiving information related to a positional relationship between the first testing target and the first sensing device;

receiving information related to a positional relationship between the second testing target and the second sensing device;

receiving information related to a positional relationship between the calibration target and the calibration sensing device; and determining a positional parameter of the first testing target and a positional parameter of the second testing target based on the positional relationship between the first sensing device and the calibration target, the positional relationship between the second sensing device and the calibration sensing device, the positional relationship between the first testing target and the first sensing device, the positional relationship between the second testing target and the second sensing device, and positional relationship between the calibration target and the calibration sensing device.

3. The system of claim 1, wherein the first sensing device, the second sensing device and the calibration sensing device are machine vision devices.

4. The system of claim 3, wherein the machine vision devices are cameras.

5. The system of claim 1, wherein the first testing target, the second testing target and the calibration target include light emitting sources.

6. The system of claim 5, wherein the first sensing device, the second sensing device and the calibration sensing device are light sensors.

7. The system of claim 1, wherein the first measuring module further includes a first supporting structure to which the first sensing device and the calibration target attach, and the second measuring module includes a second supporting structure to which the second sensing device and the calibration sensing device attach.

8. The system of claim 7, wherein the first supporting structure is rotatable relative to a first pivot axis, and the second supporting structure is rotatable relative to a second pivot axis.

9. The system of claim 8, wherein the first sensing device and the calibration sensing device move with the first supporting structure when the first supporting structure rotates relative to the first pivot axis; and the second sensing device and the calibration target move with the second supporting structure when the second supporting structure rotates relative to the second pivot axis.

10. The system of claim 8, wherein the first rotation mechanism includes a first motor for rotating the first supporting structure relative to the first pivot axis, and the second rotation mechanism includes a second motor for rotating the second supporting structure relative to the second pivot axis.

11. The system of claim 1, wherein the data processing system is configured to carry out the machine-implemented steps of:

receiving information related to a positional relationship between the calibration target and the calibration sensing device;

accessing reference data; and indicating the positions of the first sensing device and the second sensing device based on the positional relationship between the calibration target and the calibration sensing device, and the reference data.

12. The system of claim 11, wherein the reference data is related to the positional relationships between the calibration target and the calibration sensing device when the first sensing device and the second sensing device are respectively positioned to at least two discrete positions.

13. The system of claim 12, wherein the reference data is generated based on data obtained by measuring less than all possible positional relationships between the calibration target and the calibration sensing device when the first sensing device and the second sensing device are respectively positioned to at least two discrete positions.

14. The position determination system of claim 1, wherein:

the first measuring module includes a first position sensor configured to generate signals representing a position status of the first sensing device; or the second measuring module includes a second position sensor configured to generate signals representing a position status of the second sensing device.

15. The position determination system of claim 14, wherein the user interface indicates positions of the first sensing device and the second sensing device based on the signals generated by the at least one position sensor.

16. A position determination system, comprising:

a first measuring module, including a first sensing means for obtaining positional data of a first testing target relative to the first sensing device;

a calibration sensing means rigidly linked to the first sensing device, wherein the positional relationship between the first sensing device and the calibration sensing device is known; and a first rotation means for rotating the first sensing device without altering the positional relationship between the first sensing device and the calibration sensing device;

a second measuring module, including a second sensing means for obtaining positional data of a second testing target relative to the second sensing device;

a calibration target for use with the calibration sensing means for obtaining positional data of the calibration target relative to the calibration sensing means, wherein the calibration target is rigidly linked to the second sensing device, and the positional relationship between the second sensing means and the calibration target is known; and a second rotation means for rotating the second sensing device without altering the positional relationship between the second sensing device and the calibration target; and a data processing system coupled to the first and second measuring modules and configured to provide a user interface indicating positions of the first sensing device and the second sensing device.

17. The position determination system of claim 16, wherein:

the first measuring module includes first position sensing means for generating signals representing a position status of the first sensing means; or the second measuring module includes second position sensing means for generating signals representing a position status of the second sensing means.

18. The position determination system of claim 17, wherein the user interface indicates positions of the first sensing device and the second sensing device based on the signals generated by the at least one position sensing means.

* * * * *